A. B. B. HARRIS.
SYSTEM OR MECHANISM FOR SHIFTING CARS TO BE LOADED BY A POWER EXCAVATOR.
APPLICATION FILED APR. 10, 1911.
1,187,524.
Patented June 20, 1916.
9 SHEETS—SHEET 1.
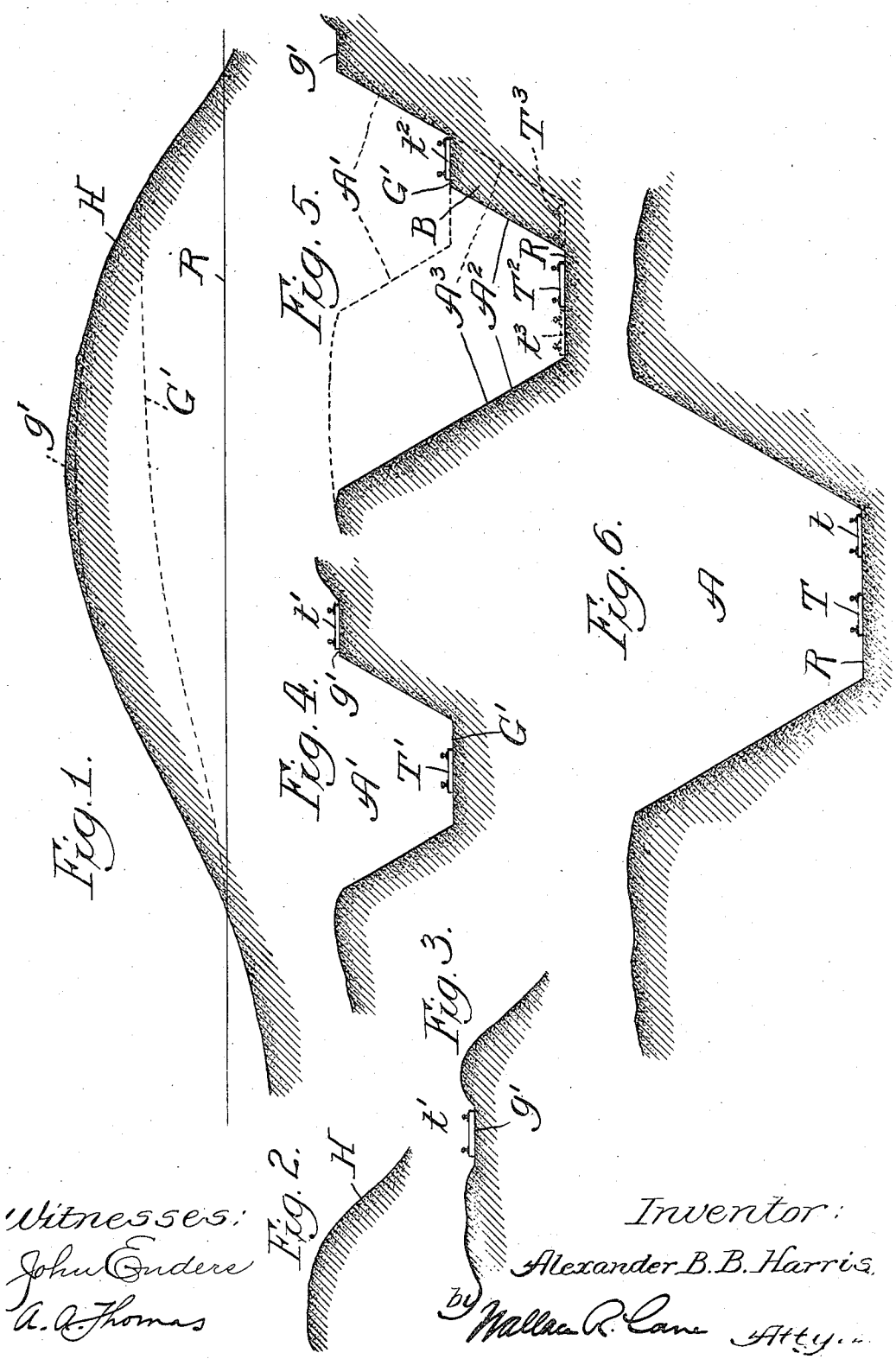
Witnesses:
John Endere
A. A. Thomas
Inventor:
Alexander B. B. Harris,
by Wallace R. Lane Atty.

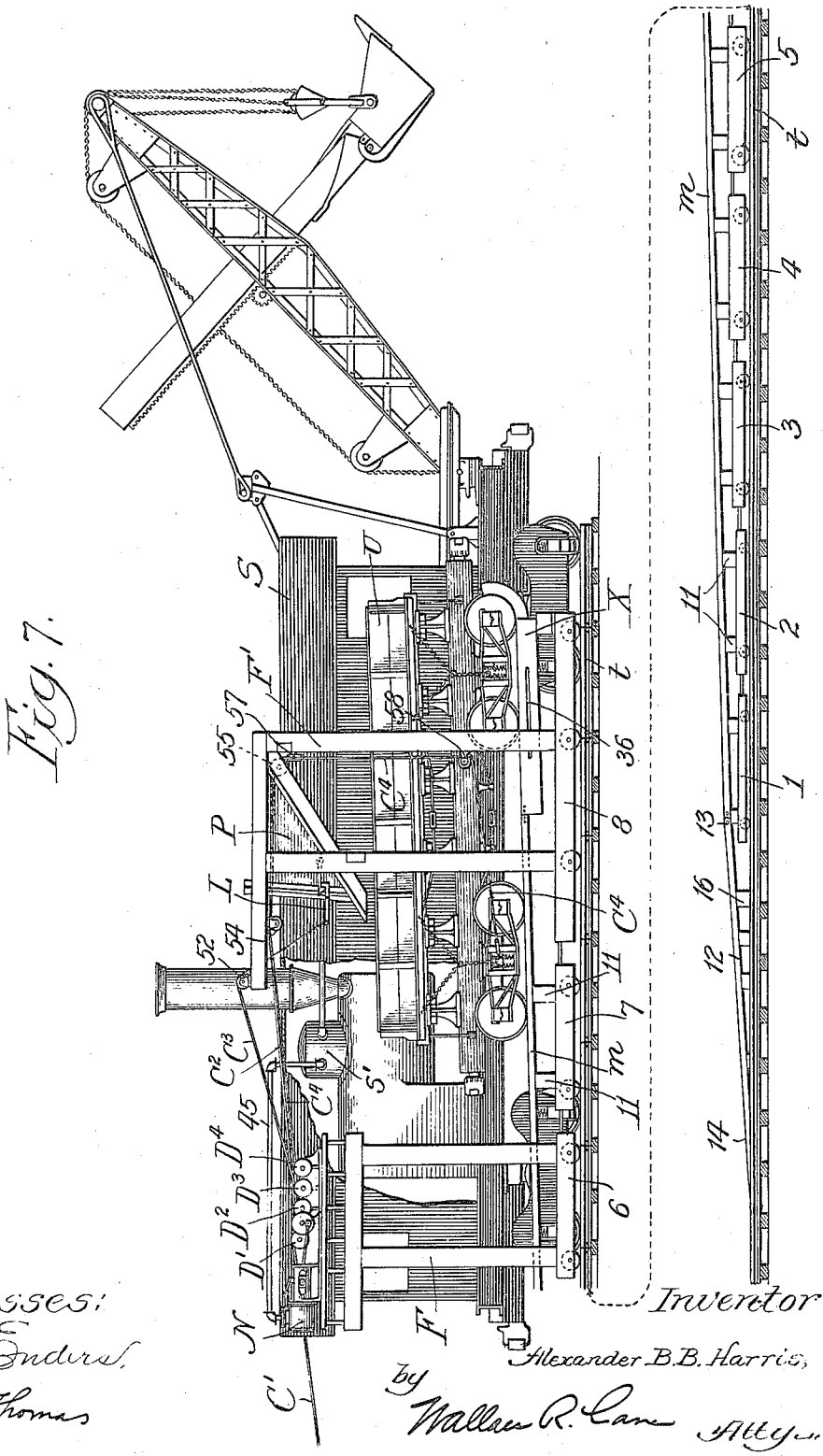

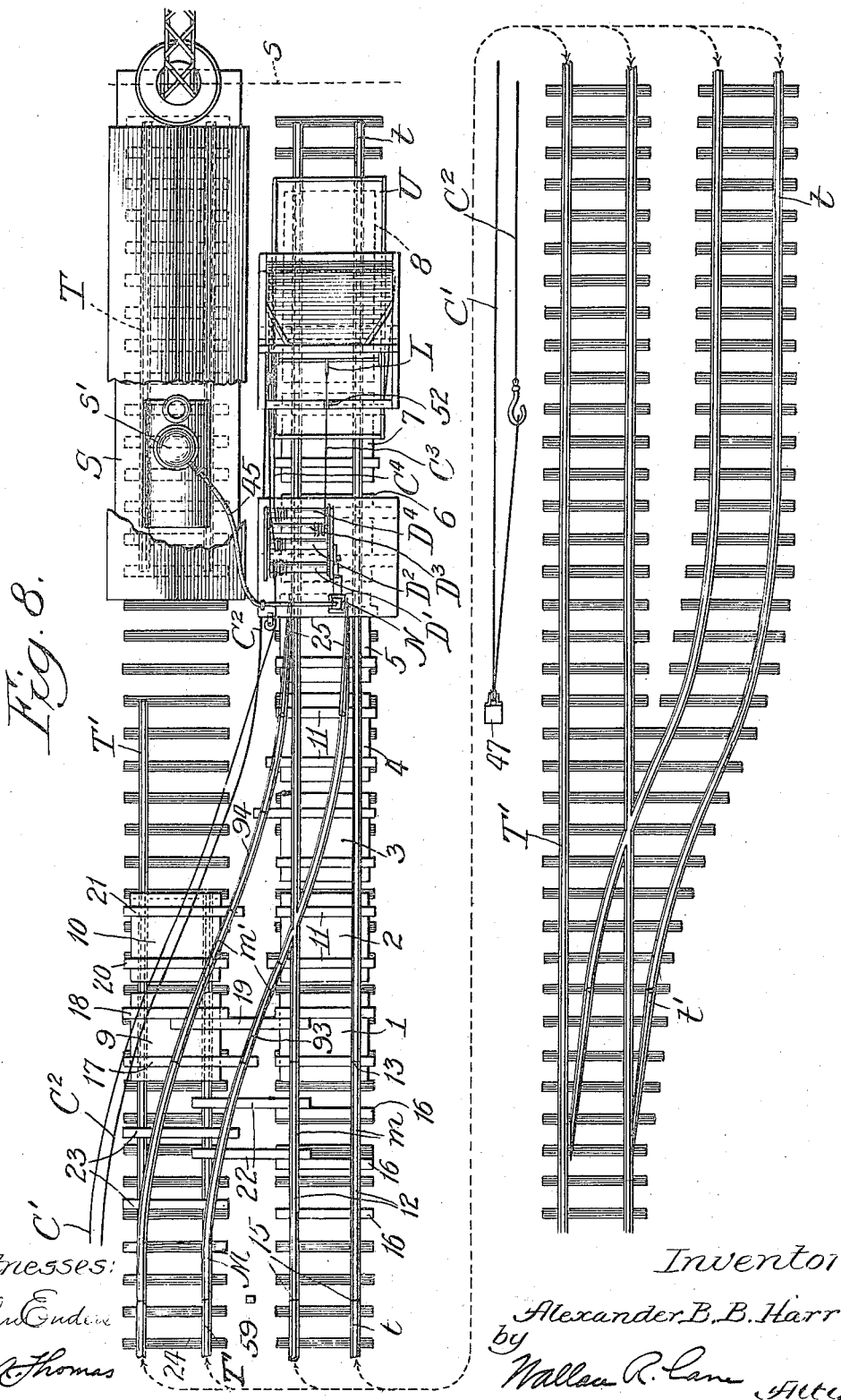

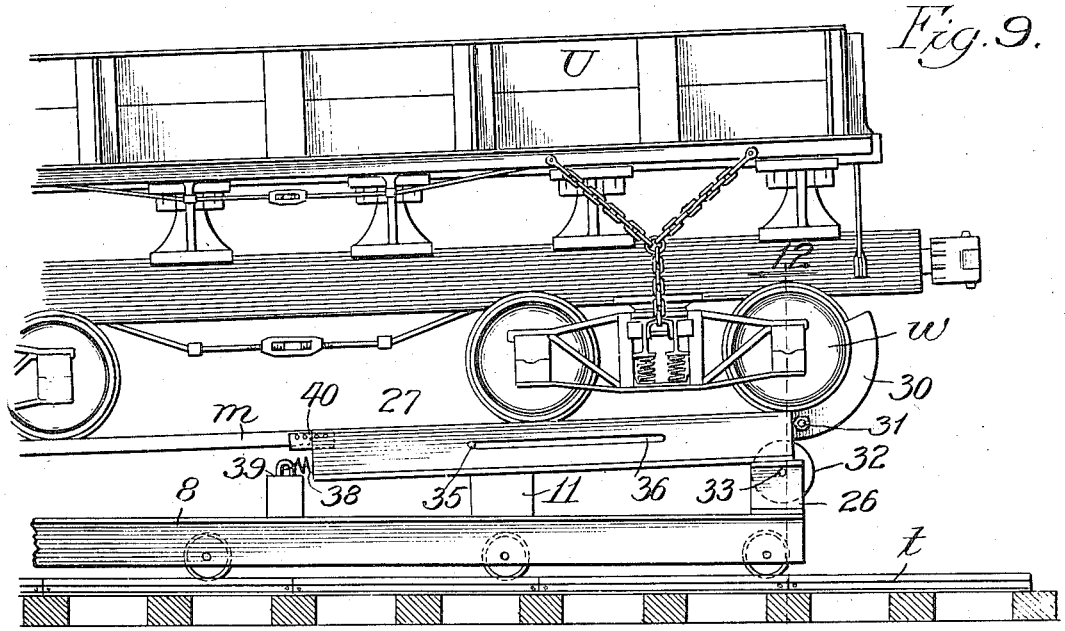
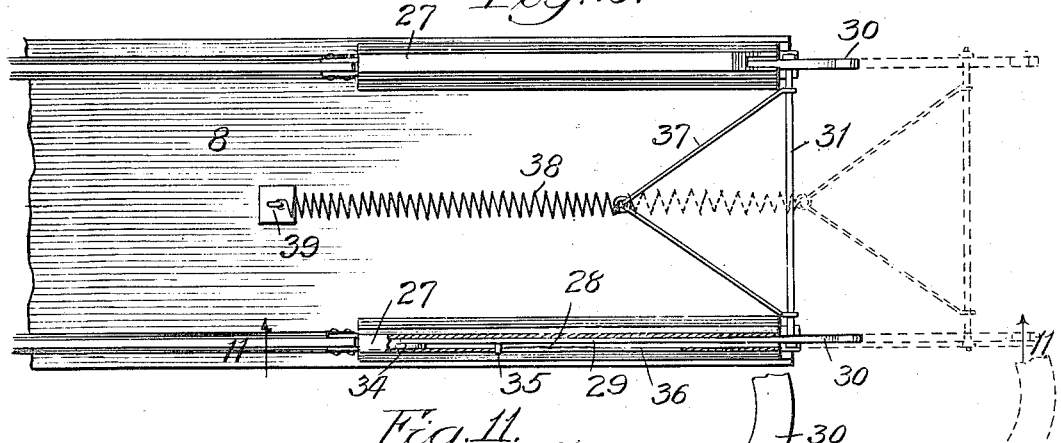
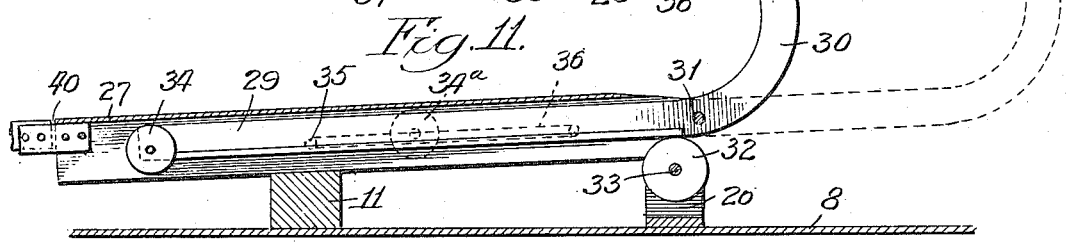

A. B. B. HARRIS.
SYSTEM OR MECHANISM FOR SHIFTING CARS TO BE LOADED BY A POWER EXCAVATOR.
APPLICATION FILED APR. 10, 1911.
1,187,524. Patented June 20, 1916.
9 SHEETS—SHEET 5.
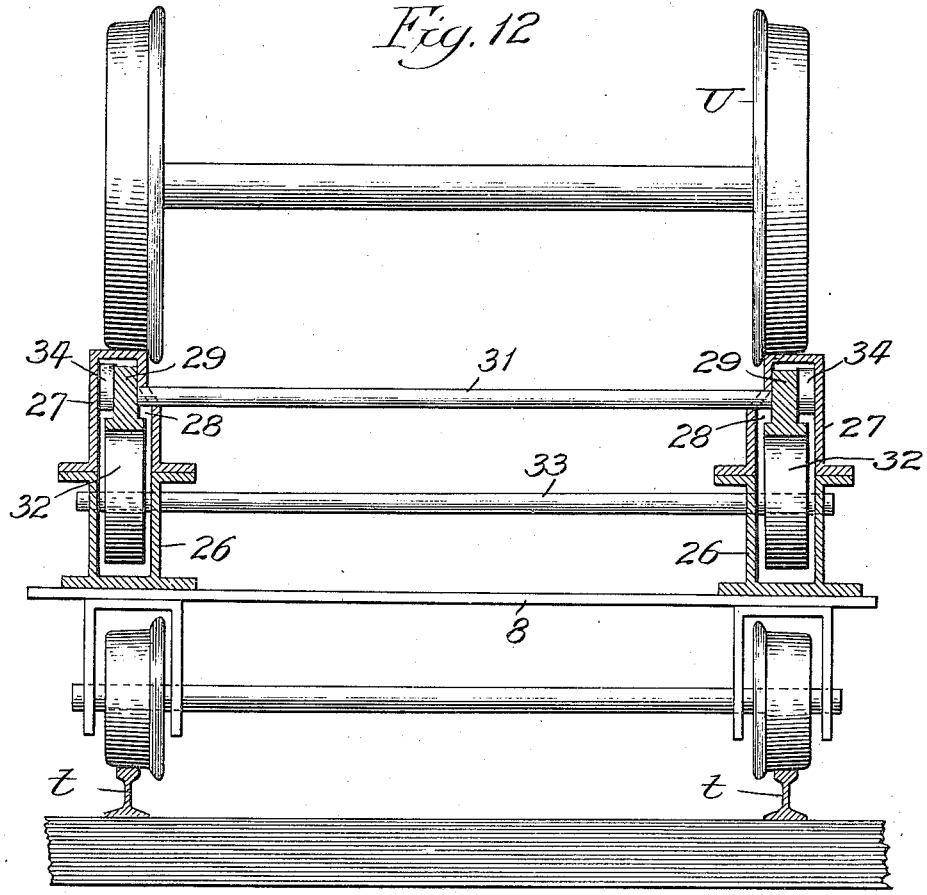
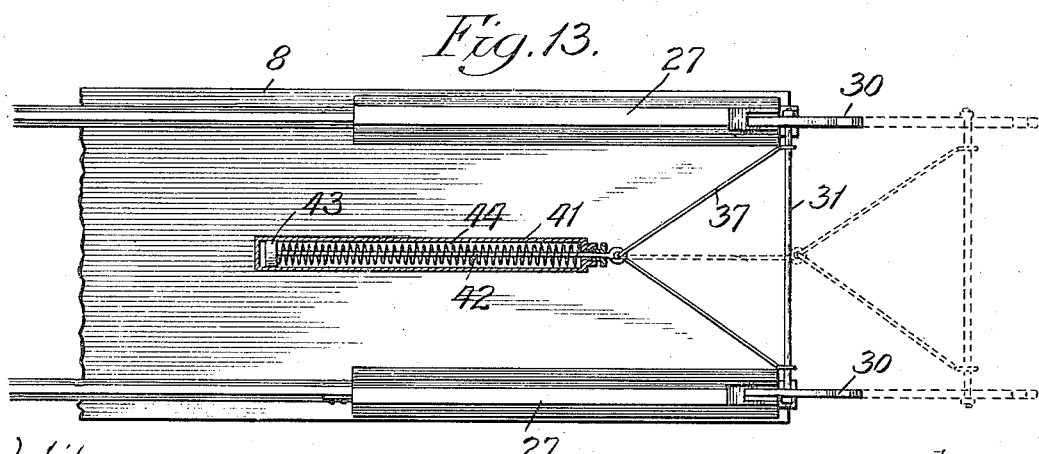

A. B. B. HARRIS.
SYSTEM OR MECHANISM FOR SHIFTING CARS TO BE LOADED BY A POWER EXCAVATOR.
APPLICATION FILED APR. 10, 1911.
1,187,524.
Patented June 20, 1916.
9 SHEETS—SHEET 6.
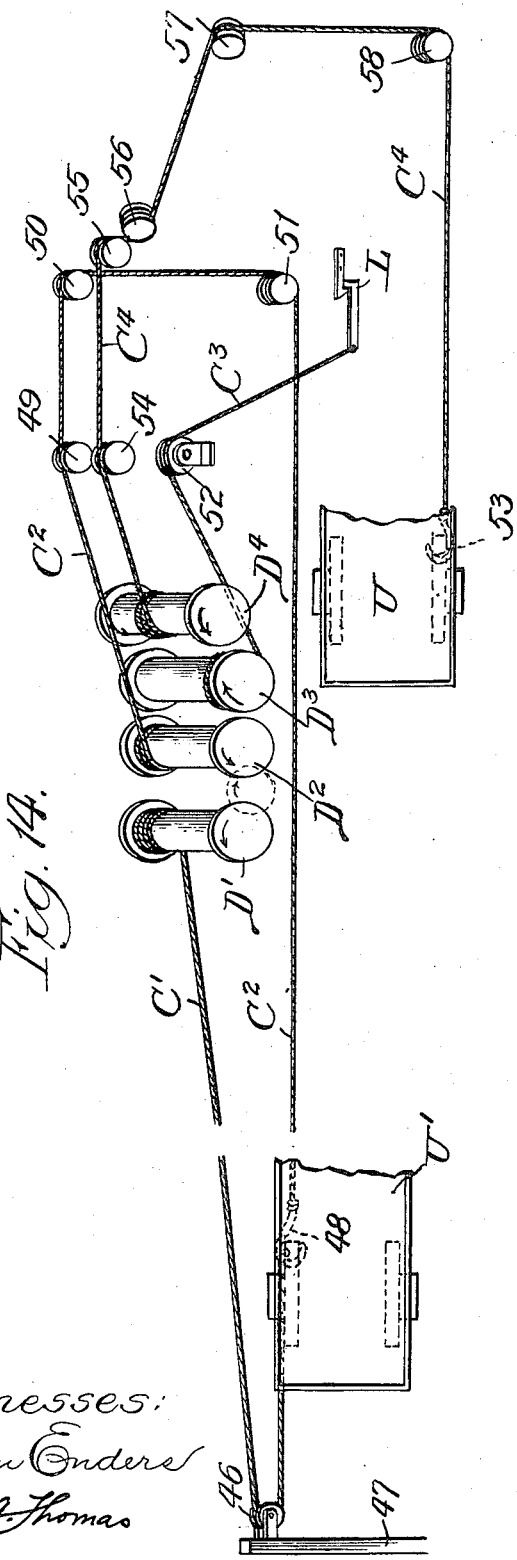
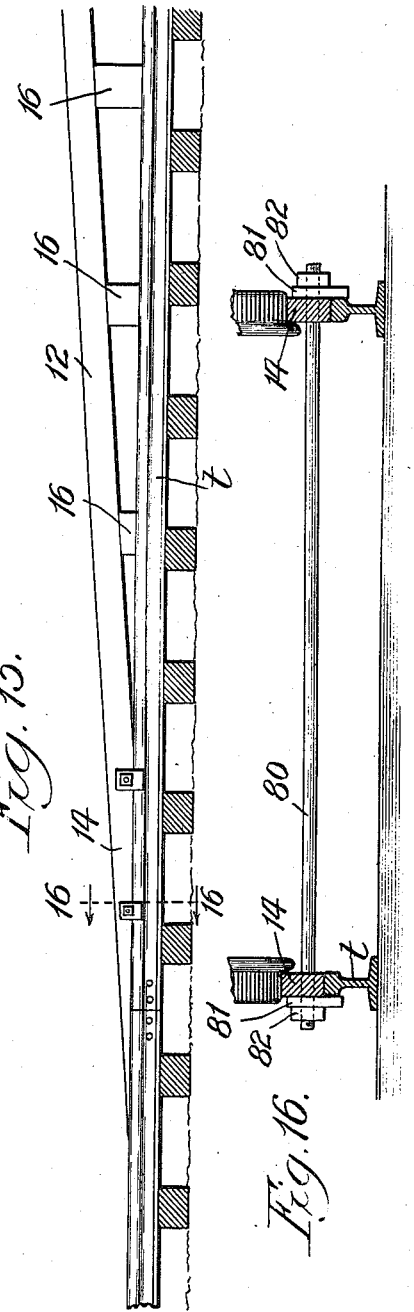

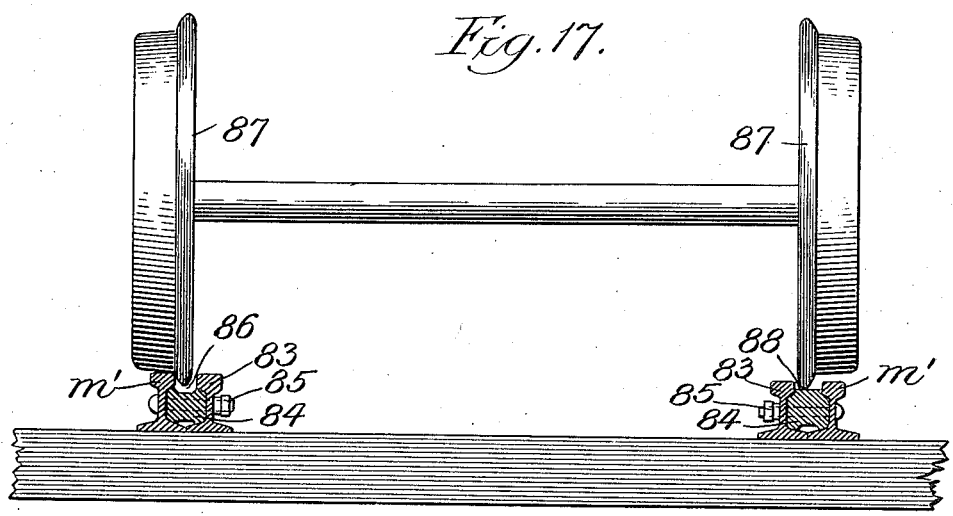
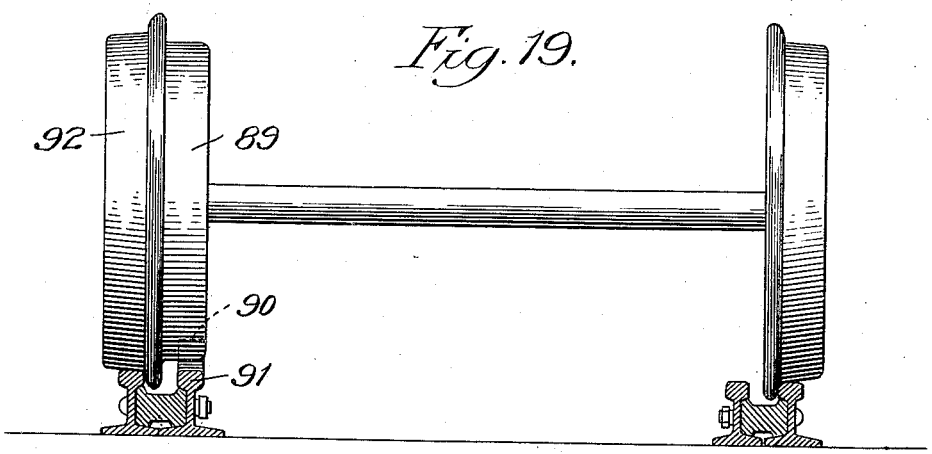
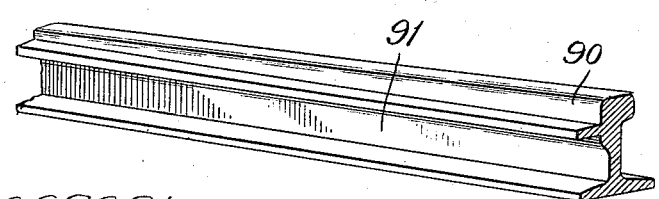

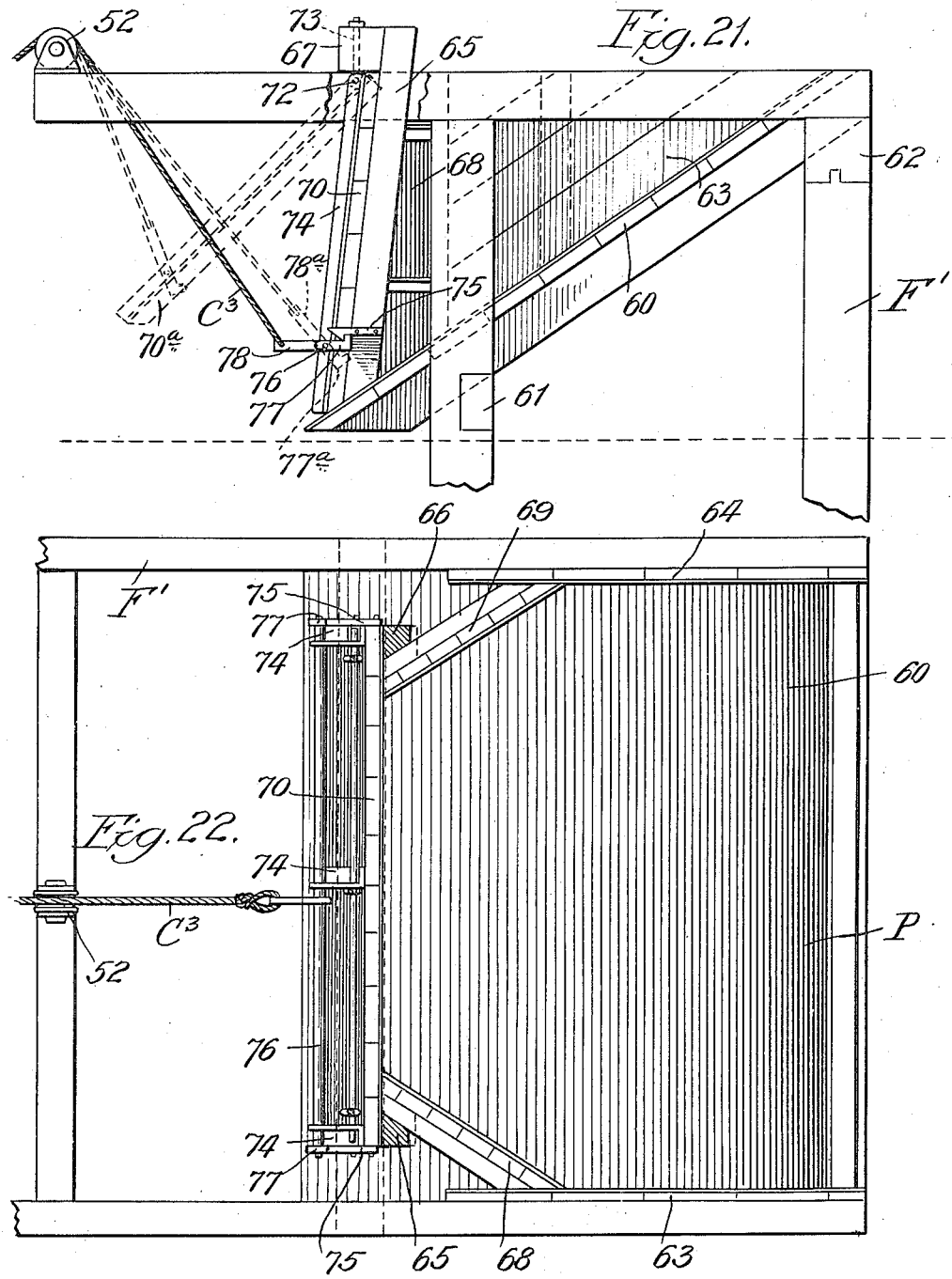

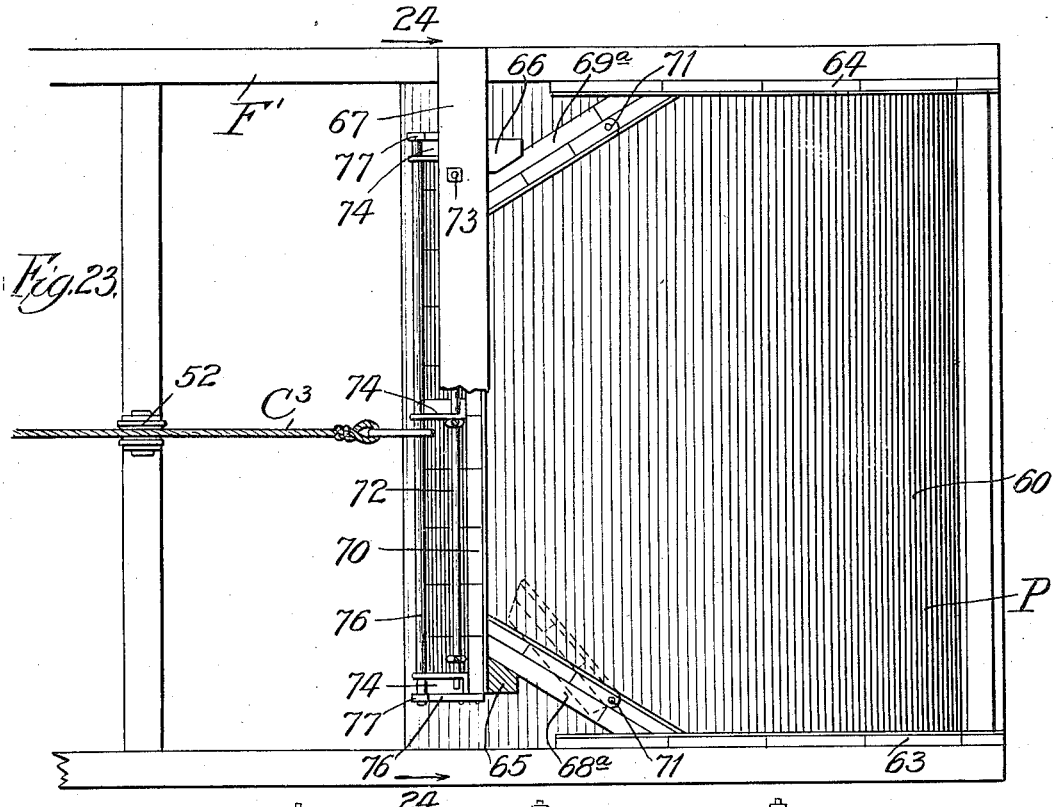
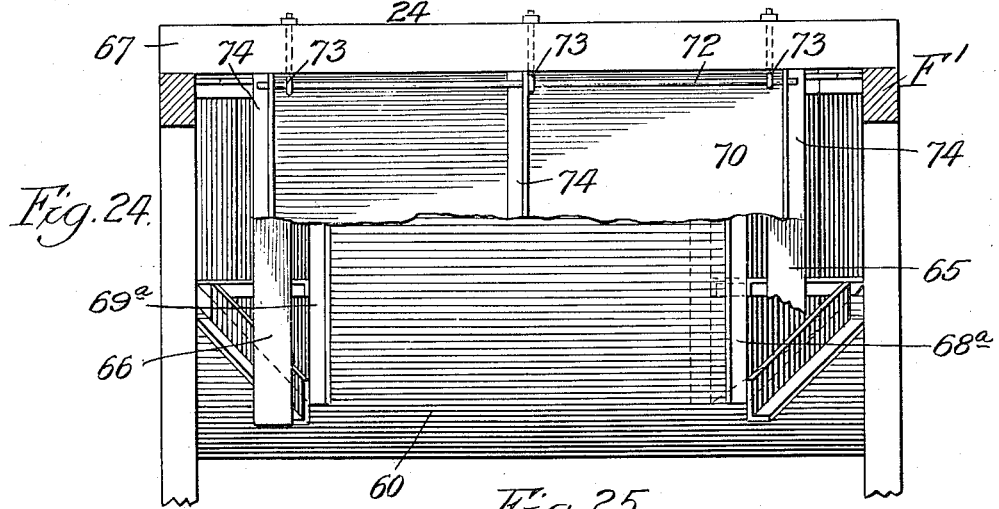

UNITED STATES PATENT OFFICE.

ALEXANDER B. B. HARRIS, OF CHICAGO, ILLINOIS.

SYSTEM OR MECHANISM FOR SHIFTING CARS TO BE LOADED BY A POWER-EXCAVATOR.

1,187,524.

Specification of Letters Patent. Patented June 20, 1916.

Application filed April 10, 1911. Serial No. 619,948.

*To all whom it may concern:*

Be it known that I, ALEXANDER B. B. HARRIS, a citizen of the United States, residing at Chicago, in the county of Cook and State of Illinois, have invented a new and useful System or Mechanism for Shifting Cars to be Loaded by a Power-Excavator, of which the following is a specification.

My invention relates to an improvement in the art of excavating or grading by steam shovels or other machines and has for its object the provision of means whereby the work of excavating or grading is greatly simplified and carried on at a correspondingly less cost as compared with the methods of operation heretofore practised.

My invention is for a system or mechanism for shifting cars into and out of loading position in excavating or grading operation of various kinds, and is particularly useful in connection with grading operation carried on by a steam shovel or other excavating machine for the preparation of road beds for railroad tracks.

In its broad aspect, my invention comprises movable track mechanism adapted to be associated with a steam shovel or other excavating machine and supported on a stationary loading track on a level with the shovel track for shifting the dump cars into and out of loading position. By the use of this mechanism a steam shovel accomplishes in one trip what required several trips under the old method of grading.

While my invention in its broad aspect is not limited to any particular form or construction of movable track mechanism, I have illustrated in the accompanying drawings the best form in which the invention is now known to me. In this form the invention includes various features of novelty which go to make up the movable track mechanism as a whole. The objects and advantages of these various features of novelty will become apparent from a detailed description of the accompanying drawings, in which—

Figure 1 represents diagrammatically the side of a hill through which a road bed is to be graded; Fig. 2 is a fragmentary cross-sectional view of the top of the hill; Fig. 3 is a view similar to Fig. 2, showing the initial loading track laid over the hill according to the old method of operation; Fig. 4 represents a transverse cross-sectional view through the hill of Fig. 1, representing diagrammatically the cut made by the steam shovel on its first trip according to the old method of operation; Fig. 5 is a diagrammatic view similar to Fig. 4, showing in full lines the shape of the cut after the steam shovel has made its second trip according to the old method of operation, the completed cut made after the third trip of the steam shovel being indicated partly in full and partly in dotted lines; Fig. 6 represents diagrammatically a transverse cross-sectional view of a complete cut made by the steam shovel in a single trip by the use of my new and improved system or mechanism for shifting the dump cars; Fig. 7 shows in side elevation a form of movable track mechanism embodying my invention and being associated with a steam shovel, the figure being in two sections so as to bring it within the limits of the sheet; Fig. 8 is a plan view of the mechanism shown in Fig. 7, the figure being in two sections for the same reason as Fig. 7; Fig. 9 is a side-elevational view showing a dump car on the front portion of the inclined track, the movable extension being in retracted position; Fig. 10 shows a plan view of the front portion of the inclined track, the adjustable extension being shown in full lines in its normal or retracted position and in dotted lines in its extended position; Fig. 11 is a longitudinal cross-sectional view substantially on line 11—11 of Fig. 10; Fig. 12 is an enlarged cross-sectional view taken substantially on line 12—12 of Fig. 9, certain of the parts being shown in elevation for the sake of clearness; Fig. 13 is a view similar to Fig. 10 showing a modified form of cushioning attachment for the adjustable extension at the front end of the inclined track; Fig. 14 is a partly diagrammatic view in perspective showing the arrangement of the cables which are controlled by the hoisting engine for operating the dump cars and also for controlling the door of the hopper which is supported on the movable track mechanism; Fig. 15 is a side-elevational view of the rear portion of the movable inclined track, showing a simple and effective method for firmly holding the pointed end of the track against lateral movement on the stationary track underneath; Fig. 16 is a transverse cross-sectional view on an enlarged scale, substantially on line 16—16 of Fig. 15; Fig. 17 is a transverse cross-sectional view of a guide arrangement adapted to be used on the turn-out section of the movable track mechanism for safely guiding the dump cars over the curved rails of the turn-out section; Fig. 18 represents a longitudinal cross-section through the guide block which is shown between the righthand pair of rails in Fig. 17; Fig. 19 is a view similar to Fig. 17 showing a modified form of the guide arrangement; Fig. 20 is a perspective view of the outer rail which is shown in Fig. 17 as engaging the outer wheel rim; Fig. 21 is a view in elevation of a new form of hopper mounted on the movable track mechanism, the door of the hopper shown in latched position in full lines and in open position in dotted lines; Fig. 22 is a plan view of Fig. 21; Fig. 23 is a plan view similar to Fig. 22 showing a hopper provided with laterally adjustable deflecting walls; Fig. 24 is a view substantially on line 24—24 of Fig. 23; and Fig. 25 is a fragmentary view in cross-section showing a hopper provided with the horizontal bottom door.

I can perhaps best explain the objects and advantages of my invention by first describing briefly the method whereby track-grading operations have been heretofore carried on. As is well known, the work of leveling or excavating for the grading of railroad beds is done by steam shovels in which a dipper is operated to scoop up the earth and dump it into a train of dump cars standing on a loading track to one side of and above the shovel track. In the diagrammatic views of Figs. 1 to 5 inclusive, I have endeavored to show as simply and clearly as possible, the various steps in the grading of road beds according to the old method. For the sake of illustration, let it be supposed that a road bed R is to be cut through the mound or hill H which has a maximum elevation of 20 ft. from the level of the proposed road bed. Under the old method of operation, the first thing to do is to cut a grading $g^1$ over the hill to one side of the proposed cut so that the first or initial loading track $t^1$ may be laid. The necessary grading for this initial loading track has to be done by teams and is an expensive as well as time consuming operation. It is over this initial loading track that the trains of dump cars are run during the first trip of the steam shovel through the cut. Enough grading is done at the approach to the hill to admit of laying the temporary shovel track on which the steam shovel runs as it moves intermittently forward during the grading operation. As the steam shovel gradually cuts its way into the hill, the temporary track over which the steam shovel has passed is removed and placed on the graded road bed in front of the shovel. The excavated earth is dumped into the dump cars held on the loading track by a locomotive. When the initial loading track is on a steep grade, as it usually is, the locomotive can only hold two or three cars at a time in loading position. This requires frequent shifting of loaded dump cars down the hill and empty dump cars up the hill. Two locomotives are used; while one is hauling the loaded dump cars to the place of unloading, the other is placing (or "spotting" as railroad men commonly call it) dump cars up the hill into loading position. During the interval required for the shifting of cars (that is to say, the hauling down of the loaded train of dump cars and the hauling up of the empty train), the steam shovel has to cease its work of excavating. A considerable amount of time is thereby lost and the effective capacity of the steam shovel is accordingly reduced. When one car of a train of dump cars is loaded to its capacity, the locomotive shifts the cars so that the next empty car is brought into proper loading position. The train of dump cars is moved rearwardly or forwardly of the steam shovel car by car until the entire train is loaded. This makes it necessary that the loading track be constructed ahead of the excavation made by the steam shovel. In the steam shovels used in this kind of work, the height to which the cutting edge of the dipper can reach is a little less than 25 ft., but the clear height under the elevated dipper when the dipper door is swung open to dump out the excavated earth, is only about 16 ft. Allowing 6 ft. for the height of the dump cars, it will be seen that the vertical distance between the shovel track and the loading track can be at most but 10 ft., because the dipper must have room to swing over the cars with the dipper door in open or depending position. The greatest depth, therefore, which the steam shovel can cut on its first trip is about 10 ft., or one-half the depth of the final cut in the case under discussion. This first cut of 10 ft. by the steam shovel is indicated by $A^1$ in Fig. 4. The track on which the steam shovel runs in its first trip is indicated by $T^1$ and rests on the initial road bed or grading $G^1$. Having made its first cut of 10 ft. through the 20-foot hill, the steam shovel is returned to the approach of the hill where the excavating operation began. The initial loading track $t^1$ is torn up and thrown down into the cut $A^1$ where the second loading track $t^2$ is laid to one side, as indicated in Fig. 5. For the sake of convenience and brevity, I call the loading track in its second position, the second loading track. The steam shovel then begins its second trip through the hill to excavate the remaining 10 ft. However, during the second trip of the steam shovel it is necessary to leave a portion B of sufficient width to support the second loading track $t^2$. The cut which the shovel makes on its second trip is indicated by A² in Fig. 5. The position of the shovel track during the second trip of the steam shovel through the cut, is indicated at T² in Fig. 5. In order to complete the cut, the steam shovel must make a third trip to cut away the portion B. After the second trip has been made the steam shovel is again returned to starting position, while the second loading track t² is thrown from the portion B down on to the bed or grading R of the cut A². During the third or last trip of the steam shovel to cut away the portion B, the shovel track is in the position indicated by the dotted lines at T³, while the loading track is laid in its third position, at indicated in dotted lines at t³ in Fig. 5. The completed cut is in Fig. 5 indicated by A³. Were the cut to be made deeper than 20 ft., the steam shovel, under the old method of operation, has to make more than three trips. It will be clear that this method of grading is slow and costly—requiring, as it does, the grading of loading tracks by teams, the use of two locomotives for hauling the loaded and empty cars, the re-laying or shifting of the loading track, the frequent return of the steam shovel to the starting point until the desired depth of cut is obtained, and the necessary delay in the excavating operation between shifts of cars.

In the use of the system or mechanism of my invention, the loading track is beside the shovel track on the same level, no initial loading track has to be graded, no locomotive is necessary for hauling the dump cars up and down steep grades, but a single locomotive is needed, there is no delay in the interval between shifts of cars, no loading track need be constructed ahead of the excavation made by the steam shovel, and (using the illustration in the preceding paragraph) the steam shovel makes but one trip to complete the cut. These and other objects and advantages are accomplished by the movable track mechanism of my invention. As herein shown, this movable track mechanism includes a series of cars for supporting track rails which rise gradually from the shovel track and the loading track and terminate at a suitable height alongside the steam shovel. This movable inclined track consists of a main section and a turn-out section. The main section lies over the stationary loading track, while the turn-out section, which rises from the shovel or main line track, curves over to the main section where it terminates in a switch. It is on these inclined rails that the empty dump cars are shifted forwardly from the shovel track up and over the turn-out section and across the switch on to the main section into loading position beside the steam shovel. The loaded cars are shifted rearwardly on to the stationary loading track from where they are hauled to a place of unloading. The unloaded cars are then again hauled forwardly for subsequent loading. The front cars of the movable track mechanism, in addition to supporting the inclined rails, may also support upright frame-works on which a hoisting engine and hopper are mounted. The hoisting engine controls the cables for hauling the dump cars into loading position on the inclined track. Preferably, the hoisting engine also controls the loaded cars as they drop down the inclined track. Where it is found desirable to use a hopper for receiving the dump from the steam shovel, the hopper is arranged to extend over the car which is being loaded and discharges its contents into the same. I might here say that wherever I use the term "movable track mechanism" throughout the description and claims of this case, I mean to include, in a general way, the different parts which move with the cars that carry the inclined rails.

Briefly stated, the mode of operation of my improved movable track mechanism in connection with a steam shovel is substantially as follows: After enough preliminary grading has been done to admit of laying the shovel track and the loading track side by side on the same level, the movable track mechanism is brought into proper association with the steam shovel and the work of excavating is ready to begin. The hoisting engine, by means of suitable cable connections, pulls up the empty dump cars, one or more at a time, from the shovel or main line track on to the movable inclined track at the side of the steam shovel. During the loading operation the car is held and controlled in proper position either by the engine or by a hand brake on the car. As each car is loaded the hoisting engine (or hand-brake, whichever is used) is operated to release the car and control it in its descent to the stationary loading track whence it is hauled to the place of unloading. In case the movable track mechanism is provided with a hopper, the steam shovel may continue its operation during the time that a loaded car or cars are dropped back and an empty car or cars pulled up, by dumping the earth into the hopper. Using the illustration given in the second preceding paragraph, it will be clear that by the use of my invention the 20-foot cut indicated at A in Fig. 6 is excavated by the steam shovel in one trip. This is due to the fact that the loading track t is always on the level of the hauling or main track T' and need not be constructed ahead of the steam shovel. The movable track mechanism and the steam shovel are always side by side, so that the grading R (see Fig. 6) is made not only for the shovel track, but also for the loading track. Assuming that the dipper of the steam shovel has a reach of nearly 25 ft.

from the shovel track, there is no difficulty in excavating the 20-foot cut A in a single trip of the steam shovel. As a matter of fact, any depth of cut can be made in a single trip of the steam shovel by the use of my movable track mechanism, provided some means (such as blasting) is employed to loosen up the material so that it will run to the shovel.

I will now give a detailed description of the particular embodiment of my invention illustrated in the accompanying drawings.

Referring to Figs. 7 and 8, a suitable form of steam shovel is, as a whole, indicated by S. Inasmuch as the construction and operation of the steam shovel S are well understood by those skilled in the art, no description thereof is here necessary, particularly since my invention may be associated with any kind of power excavator. The shovel track (that is to say, the temporary track on which the steam shovel is supported) is shown in dotted lines and indicated by T. The hauling track T' is on the same grade as the shovel track T and may also be considered as the main line track, because in the use of my invention hauling track T' may be laid permanently, whereby a great saving of time and expense is accomplished. This cannot be done under the old method of operation where the shovel and loading tracks have to be re-laid from one grade to another, as explained in the foregoing part of this specification. The loading track is, as a whole, indicated by t in Figs. 7 and 8. The tracks T' and t are laid side by side on the same grade or level. The dotted lines connecting the two sections of Figs. 7 and 8, are intended to indicate that the lower section of each figure is a continuation of the upper section. The loading track t runs into the main line or hauling track T at the switch point t'. The loaded cars when released, run by gravity over the loading track t from where they are hauled by engine or otherwise on to the hauling track T' to the place of unloading. The unloaded cars are returned on the track T' to a point at the right (as viewed in Fig. 8) of the switch point t'. The movable track mechanism includes a series of cars numbered successively 1 to 8 inclusive and a second series of cars numbered 9 and 10 (see Fig. 8.) The main series of cars is arranged to run over the loading track t, while the second series of cars 9 and 10 is arranged to run over the main line or hauling track T'. The cars 9 and 10 do not appear in the side elevation of Fig. 7 because they are directly behind the cars 1 and 2 and are substantially similar in construction to these cars. The cars 1 to 8 gradually increase in height and support the inclined rails m. Each car is provided with a pair of transverse beams 11 on which the rails m rest. The rails m are at the lower end provided with the extension rails 12 which are connected with the rails m at the point 13 and rest at their tapered end 14 on the rails of the loading track t. The tapered ends 14 may be hinged to the rails m at the point of connection 13, or pins may be used to form a readily detachable connection. The purpose of this hinged or readily detachable connection will appear later on. In Fig. 8 the extension rails 12 are shown as terminating on the loading track t at the point 15. The extension rails 12 as they gradually rise from the level of the loading track t are supported on transverse beams 16. The car 9 carries a pair of transverse beams 17 and 18. The transverse beam 19 is jointly supported by the cars 1 and 9. The car 10 carries a pair of transverse beams 20 and 21. A pair of transverse beams 22 rests at one end on the shovel track T' and at the other end on the loading track t. The beams 23 rest on the hauling track T'. The inclined rails m' rise from the hauling track T' at the point 24 and curve over to meet the inclined rails m at the switch point 25. As clearly seen from Fig. 8, the rails m' are supported on the transverse beams 23, 22, 17, 19, 18, 20, 21 and the beams on the cars 2, 3, 4, and 5. The rails m may be called the main section and the rails m' the turn-out section of the inclined track indicated, as a whole, by the letter M. It is to be understood that the rails of the turn-out section have tapered extensions or ends similar to the tapered ends 14 above described, and are hinged or detachably connected to the rails m'. The inclination of the track M is such as to give the loaded cars a momentum sufficient to carry them to a suitable point from which they are hauled to the place of unloading by a locomotive or otherwise. In the embodiment illustrated in the drawings, I have shown eight cars in the main series and two cars in the second series, but it is obvious that the number of cars may be varied in accordance with the length of inclined track which it is desired to have. Also the size and construction of the cars may be varied to suit circumstances. Nor need the cars be provided with wheels; they may have slides resting on the rails beneath, or any other suitable device for permitting the cars to be moved over the shovel and loading tracks. The switch is preferably a spring-switch which is normally open as shown in the upper section of Fig. 8, so that cars dropping down the main section of the inclined track M are in no danger of running on to the turn-out section, while the empty cars which are hauled up the turn-out section readily pass on to the main section into loading position. As seen from Fig. 8, the front or higher end of the movable inclined track M terminates at a point to the rear of the frame-work of the steam shovel so as to permit the dipper to work directly in front of the loading track. In practice the loading track would terminate about 3 ft. to the rear of the line s (see Fig. 8) passing through the pivot point of the swing circle on which the boom is mounted. Where there would be no interference with the proper working of the dredge or shovel, the loading track can be laid ahead of the shovel. In any case, the loading track should in practice be laid as far ahead as possible. This brings the angle of swing of the dipper to a minimum when swinging to dumping position, as it permits the loading of a maximum length of car or cars at one shift. In the specific construction illustrated in the drawings, the inclined track M terminates at its higher end in an automatically adjustable extension X. Where short cars of about 6 ft. in length are used for carrying away the excavated earth, this extension may not be necessary. However, to enable the proper loading of two or more short cars at one time or a long car of, say, 12 ft. length, it is necessary that the short cars, or the long car, be adjusted during the loading operation. This is done by the adjustable extension referred to.

I will now describe the form of adjustable extension shown in Figs. 9 to 13 inclusive.

The car 8 is at its front end provided with a pair of U-shaped supports 26 in vertical alinement with the rails of the loading track. On the cross-beam 11 and the supports 26 rest the inverted U-shaped track members 27 which form a continuation of the rails m, as best shown in Fig. 9. In the hollow or chamber 28 of each track member 27 operates the extension member 29 which at its outward end terminates in the upwardly curved portion 30. A cross-bar 31 connects the extension members 29 together near their front ends where they are supported on the rollers 32 journaled in the supports 26. By providing a single shaft 33 for the rollers 32, the supports 26 are at the same time braced and strengthened. At the rear end each extension member 29 is provided with a roller 34 which is normally out of contact with the top of the track member 27, as shown in Figs. 11 and 12. Each extension member 29 is provided with a pin or stud 35 arranged to operate in the longitudinal slot 36 of the associated track member 27. A yoke piece 37 is at one end connected to the ends of the cross-bar 31. An expansion spring 38 is at its front end connected to the rear of the yoke 37 and at its other end to a suitable support 39 rising rigidly from the car 8. The tendency of the spring 38 is to normally hold the extension members 29 inwardly with the pins 35 resting against the rear end of the slots 36, as shown in Figs. 9, 10 and 11. When the front wheels w of a car U strike the upwardly turned portions 30 of the extension members 29, as the car is hauled into proper loading position, the spring 38 and the extension members 29 are forced outwardly until the pins 35 engage the front ends of the slots 36. The dump car U may, therefore, go beyond the position shown in Figs. 7 and 9 by an amount determined by the length of the slots 36. As the front of the car presses down upon the front ends of the extension members 29, the rear ends of these members are tipped upwardly until the rollers 34 bear against the top of the track members 27, as indicated in dotted lines at 34ª in Fig. 11. The extension members 29, therefore, operate with little friction, the rollers 32 acting as roller bearing at one end and the rollers 34 acting as roller bearing at the other end. The track members 27 are at the rear end rigidly connected with the rails m by any suitable means—such as plates or bars 40 which are securely bolted in place. The object of this automatically adjustable extension is to admit of cars being pulled beyond the point where the working of the shovel permits the laying of a permanent track. When the rear of a long car (or the rear car, if more than one are in loading position at a time) is loaded, the car is dropped back off the extended members 29 of the extension X, whereupon the spring 38 pulls the extension members 29 back to their normal position out of the way of the dipper. The steam shovel is then free to work directly in front of the loading track and load the rest of the car or cars. In the modification of Fig. 13 the cushioning or shock-absorbing means for the extension rails 29 is a combined spring and pneumatic arrangement. In this figure a substantially air-tight cylinder 41 is rigidly carried by the car 8. A compression spring 42 is arranged within the cylinder 41. One end of this spring bears against the forward end of the cylinder while the other end bears against the piston head 43 which is fixed upon the free end of the rod 44. The other end of the rod 44 is connected to the yoke 37 which is connected to the cross-bar or tie-rod 31. As the wheels of the car engage the upwardly curved portions 30 and force the extension members 29 outwardly, the spring 44 is compressed and absorbs the shock caused by the sudden engagement of the car with the extension members 29. At the same time piston head 43 compresses the air in the cylinder, thereby forming an air cushion which assists the spring in relieving the concussion. When the extension members 29 are released from engagement with the dump car, the compression spring 44 returns the same to inward or normal position. The combined spring and pneumatic cushioning attachment of Fig. 13 is readily applicable to any stub end track and when used in connection with bumping posts it will relieve the train from the hard pound and consequent damage which result when the cars are jammed against a rigid bumper. The lugs 35 and slots 36 can be dispensed with if the anchorage of the extension members 29 to the car 8 through the spring or like attachment is sufficient to prevent the dump car from being carried too far. It is obvious that the structural details of the automatically adjustable extension X may be varied and modified without departing from the basic idea of this feature—namely, automatically adjustable extension members for temporarily extending the length of the inclined track, so that a dump car may be placed or "spotted" beyond the point where the working of the shovel admits the laying of a permanent track. So far as this feature of my invention, is concerned, I do not intend to be limited to the precise form of adjustable extension herein shown and described for the sake of illustration, inasmuch as the basic idea of this feature may be embodied in a variety of mechanical constructions.

Referring to Fig. 7, it will be seen that one of the cars (namely car 6) carries an upright frame work indicated, as a whole, by F. On top of this frame-work is mounted a suitable hoisting engine indicated, as a whole, by N. As this hoisting engine may be of any approved and well known type, no description of its details of construction is necessary to an understanding of my invention. This engine operates cable connections for controlling the movement of the dump cars, as will presently be described in detail. The steam coupling 45 connects the steam cylinder of the hoisting engine N with the steam dome $s'$ of the locomotive boiler of the steam shovel. In this way the steam for operating the drums of the hoisting engine is taken from the boiler of the steam shovel, thereby dispensing with the necessity of a separate boiler for the hoisting engine. I have shown the hoisting engine carried by one of the cars of the movable track mechanism. However, the arrangement of the hoisting engine, as shown in the drawings, permits the use of my invention with steam shovels already on the market. It is immaterial to the broad idea of my invention whether the hoisting engine is carried on the steam shovel or on the movable track mechanism. The cable connections leading from the drums of the hoisting engine are shown in Figs. 7, 8 and 14, the latter figure showing these connections most clearly in what may be called a diagrammatic perspective view. The drum $D^1$ of the hoisting engine operates the rope or cable $C^1$ which leads from the drum to a snatch block 46 mounted on a post 47. As best shown in Fig. 8, the post 47 is arranged at one side of the shovel track T near where the loading track $t$ curves into the shovel track. The free end of the cable $C^1$ is attached to the hook 48 of the cable $C^2$. As will presently appear, the cable $C^1$ may properly be called a tail rope because it is always attached to the cable $C^2$ to pull the latter to the rear for hooking on to an empty car. The cable $C^2$ is wound upon the drum $D^2$ and is the hauling cable, its function being to haul empty dump cars up on the inclined track M into loading position. Suitable guide sheaves or pulleys are arranged for guiding the cable $C^2$ from the drum $D^2$ down the upright frame-work F' which is carried by the car 8, as best shown in Fig. 7. From the drum $D^2$, the hauling cable $C^2$ passes over the pulley 49, then over the pulley 50, then downwardly under the pulley 51. These three pulleys are arranged on the inside of the frame-work F'. The frame-work F' carries a hopper indicated, as a whole, by P. In some instances no hopper may be necessary, but where the excavating is to be carried on as expeditiously as possible without any delay in the working of the steam shovel during shifts of cars, the hopper accomplishes this result—as will subsequently appear when the operation of the mechanism is taken up in detail. The gate or door of the hopper P is provided with a latch device indicated, as a whole, by the letter L in Figs. 7, 8 and 14. This latch device is operated by the cable $C^3$ wound upon the drum $D^3$. The cable $C^3$ passes over the guide pulley 52 arranged centrally at the rear end of the frame-work F'. When the cable $C^3$ is wound on the drum $D^3$, the latch L is unlatched and the gate or door of the hopper P is swung open to discharge the contents of the hopper into the dump car underneath. After an empty car has been hauled into loading position on the inclined track M, it must be held there until loaded. In order to relieve the hauling cable $C^2$ of this function so that this cable may be ready to haul up the next empty car as soon as the preceding car is loaded, I provide a holding cable $C^4$ which is wound upon the drum $D^4$. The cable $C^4$ is at its free end provided with a holding hook 53 adapted to be temporarily attached to a suitable point on the dump car which is being loaded. Guide pulleys are suitably arranged to properly guide cable $C^4$ from the drum $D^4$ to the opposite side of the frame-work F'. From the drum $D^4$ the holding cable $C^4$ passes over the guide pulley 54, then over the guide pulley 55, then over the guide pulley 56 which is arranged at right angles to the guide pulley 55, then across the frame-work to the guide pulley 57, then downwardly to the guide pulley 58. In the practical arrangement of the guide pulleys for the different cables, the pulleys 49 and 54 would be arranged side by side on the same axis, as would also the pulleys 50 and 55; the lower pulleys, 51 and 58, would be arranged in alinement with each other on opposite sides of the frame-work F'. In the diagrammatic perspective view of Fig. 14, the mechanical alinement of the pulleys is not shown, the different guide pulleys having, for the sake of clearness, been separated and arranged in semi-perspective to clearly show all of the cables. When the hoisting engine is operated $D^1$, $D^2$, $D^3$ and $D^4$ rotate in alternately reverse directions.

As is well understood by those skilled in the art, the direction of rotation of each drum is indicated by the arrow thereon. Each of the drums is independently controlled by a suitable lever. Since the operation of hoisting engines is well understood no detailed description thereof is here deemed necessary. The shifting of cars into and out of loading position may perhaps best be understood from a consideration of Fig. 14, to which reference will now be had. In this figure the dump car U is represented to be in loading position similar to the car U in Fig. 7. The holding cable $C^4$ is hooked to a convenient point on the truck frame of the car. If it is necessary to adjust the position of the car while being loaded the drum $D^4$ is operated to take up or pay out the cable $C^4$. When the car has been loaded the drum $D^4$ is released and gravity causes the loaded car to roll down the main section $m$ of the inclined track. The momentum of the car is sufficient to carry it down over the switch point $t'$ of the loading track on to the main track T to a point from which it is hauled to the place of unloading. When the loaded car has come to a stop, the holding cable $C^4$ is unhooked and the drum $D^4$ operated to wind up the cable. As soon as the loaded car has passed from the main section $m$ on to the rails of the loading track $t$, the drum $D^2$ is operated to wind up the hauling cable $C^2$ which has in the meantime been hooked to an empty car standing on the main line or hauling track T' in front of (to the right as viewed in Fig. 8) the switch point $t'$. In order to enable the operator of the hoisting engine to ascertain when a loaded car has passed on to the loading track $t$, a clearance post 59 may be arranged between the shovel track T and the loading track $t$ near the point where the inclined track M rises from the tracks T' and $t$, as shown in Fig. 8. In this way, while the holding cable $C^4$ is being paid out until the loaded car comes to a stop or has slowed down sufficiently to permit unhooking of the cable, the hauling cable $C^2$ is wound up on the drum $D^2$ to pull up the next empty car (diagrammatically indicated by U' in Fig. 14.) During the short interval of time that a loaded car drops back and an empty car is hauled up, the steam shovel dumps the excavated material into the hopper P, the gate of the hopper being, of course, closed. If no hopper is used, the steam shovel waits until the next empty car is in loading position. If desired, the tail rope $C^1$ may be omitted and the holding cable $C^2$ dragged back by one of the workmen to be hooked on to the next empty car. However, the tail rope $C^1$ is preferable since it pulls back the holding cable $C^2$ automatically. The holding cable $C^4$ may, if desired, be replaced by a brake on the car. This would of course, necessitate the presence of a man on the car to control the brake. As soon as a car has been hauled into loading position by the cable $C^2$, the holding cable $C^4$ is hooked on the hauling cable $C^2$ is unhooked to be drawn back by the tail rope $C^1$. If the brake on the car is used in place of the holding cable $C^4$, the brake is applied as soon as the car is in proper loading position and is released when the car has been loaded. The holding cable $C^4$ is so controlled by means of the drum $D^4$ that the loaded car does not roll too far or run into another car. In this event the cable $C^2$ will be released to allow the loaded car to drop back to the desired point, whereupon the cable would be unhooked from the loaded car and hooked on to the empty car. As I have already stated, the switch 25 of the turn-out section $m'$ is preferably what is known as a spring-switch which is normally open but readily yields to allow the empty cars to pass from the turn-out section to the main section of the inclined track M. This dispenses with the necessity of an attendant to set the switch into open position each time a loaded car is ready to drop back. A similar arrangement may be used for the switch $t'$, so that the loaded cars will readily pass on to the hauling or main line track T' from the loading tract $t$, while the empty cars run up on the main line track.

I have previously stated that by providing a hopper P on the movable track mechanism, the shovel need not stop working between shifts of cars, but may dump the excavated earth into the hopper which is made large enough to hold the material that the shovel will excavate while a shift of cars is being made. Although this hopper is a desirable feature, my invention is, in its broad aspect, not limited to a movable track mechanism provided with a hopper. The preferred embodiment illustrated in the drawings shows the hopper P carried by the frame-work F so as to extend over the car which is being loaded. The hopper P may be of any suitable construction, but in the preferred embodiment of my invention, this hopper is of the construction shown in Figs. 21 to 24 inclusive, which will now be described in detail. The hopper shown in these figures comprises an inclined bottom 60 secured to the transverse beams 61 and 62 of the frame-work F'. The side walls 63 and 64 of the hopper are substantially triangular in form and are rigidly held in place on the frame-work F'. A pair of uprights 65 and 66 is at the lower end secured to the bottom 60 and at the upper end to the cross-beam 67 mounted on top of the frame-work F'. A deflector plate or wall 68 is secured between the upright 65 and the side wall 63, while a similar deflector plate 69 is secured between the upright 66 and the side wall 64. The opening at the front of the deflector plates 68 and 69 is adapted to be closed by the door or gate 70 which rests at its sides against the uprights 65 and 66. In Figs. 21 and 22 the deflector plates 68 and 69 are rigid, while in the modified form shown in Figs. 23 and 24 the deflector plates 68ª and 69ª are pivoted at the point 71 so as to be adjustable to "trim" the load of the car. Where the deflector plates are rigid, the mouth or opening of the hopper is always central with respect to the car underneath. It may sometimes be desirable to load a car more at one side than at the other and facilitating the dumping of the car. This is readily accomplished by the adjustable deflector plates 68ª and 69ª. For instance, if the deflector plate 68ª is adjusted into the position shown in dotted lines in Fig. 23, the mouth or opening of the hopper is no longer central with respect to the car, and the load will be heavier on the farther side (considering the plan view Fig. 23) of the car. This process of loading a car heavier on one side than on the other is known by railroad men as "trimming the load." Any suitable means may be provided for adjusting the movable deflector plates 68ª and 69ª and holding them in adjusted position. The only difference between Figs. 21 and 22, on the one hand, and Figs. 23 and 24 on the other, is that Figs. 23 and 24 show the deflector plates adjustable. For this reason the detailed description of Figs. 21 and 22 applies equally well to Figs. 23 and 24, with the exception already noted. The gate or door 70 is pivotally hinged on the rod 72 suspended from eye-bolts 73 carried by the transverse beam 67. The body of the gate 70 is provided with angle irons 74 having openings through which the rod 72 passes. Each of the uprights 65 and 66 is provided with a rigid catch 75. Through the lower portion of the angle irons 74 of the gate 70 passes a rod 76 to the outer ends of which are secured latch members 77 adapted to come into locking engagement with the catches 75, as shown in Fig. 21. At its central portion the rod 76 has rigidly secured thereto the operating arm 78 to which the free end of the cable C³ is connected. The catches 75 and latch members 76 constitute the latch device heretofore referred to in a general way by the reference letter L in the detailed description of Fig. 14. When a pull is exerted on the cable C³, the arm 78 is rocked into the position indicated in dotted lines at 78ª in Fig. 21 and the latch members 77 assume the position indicated in dotted lines at 77ª in the same figure. The first effect of a pull on the cable C³ is, therefore, to unhook the latch members 77 from the catches 75. A further pull on the cable C³ swings the gate 70 upwardly into open position as indicated at 70ª in Fig. 21. When the cable C³ is released, the door 70 drops back by gravity into closed position and the latch members 77 automatically move into latching engagement with the catches 75. It has already been stated that the cable C³ is controlled by the drum D³ of the hoisting engine. This connection between the hoisting engine and the hopper gate is of great advantage, since the operator of the engine has the hopper under full control. The feature of the automatic latch insures the locking of the hopper gate in closed position to receive the dump from the steam shovel while a shift of cars is being made. Besides preventing an interruption in the operation of the shovel while cars are being "spotted," another advantage of the hopper lies in the fact that it materially lessens car repairs by relieving the cars of the impact of material dumped out of the steam-shovel dipper. The hopper also eliminates the danger of and damage done to the cars by being struck by the dipper, as sometimes happens where the dipper discharges directly into the cars. The hopper may conveniently be constructed of wood with sheet metal lining on the inside. In the modified form of hopper shown in Fig. 25, the hopper P' is at the bottom provided with a door or gate 79 hinged at 79ª and held in closed position by the cable C³. In this case it is necessary to hold the cable C³ taut in order to hold the door 79 closed. When the cable is released the door swings downwardly into open position.

In Figs. 15 and 16 I have shown simple and effective means for holding the pointed ends of the inclined track M against the lateral movement on the tracks T' and t. Through the pointed ends 14 of the extension rails 12 pass the cross-bars 80. At each end of the cross-bars 80 is clamped a retaining plate 81 held in place by a nut 82. The retaining plates 81 extend below the heads of the rails t on the outside thereof and thus rigidly hold the extension rails 12 against lateral or transverse movement on the rails t of the loading track, while permitting longitudinal movement thereof over the rails t. This retaining means is also applied to the tapered ends of the turn-out section m'. As far as the broad idea of my invention is concerned, any suitable retaining device may be employed for holding the tapered ends of the inclined track M against lateral movement on the loading track.

In order to facilitate the passage of the dump cars over the curved rails at the turn-out section $m'$, I have provided means for automatically guiding the cars over the curves of this turn-out section. The function of this guiding means consists in automatically varying the effective diameter of the car wheels at one side so that the tendency of the car will be to move in the arc of a circle which is calculated to coincide with the curvature of the turn-out section $m'$. In the form of guiding means shown in Figs. 17 and 18, the effective diameter of the outside wheels is automatically increased, while in the form shown in Figs. 19 and 20 the effective diameter of the inside wheels is automatically decreased, the result produced being in both instances the same. Referring first to Figs. 17 and 18, it will be seen that the rails of the turn-out section $m'$ are provided with guide rails 83 rigidly connected with the rails $m'$ and spaced therefrom by the filler blocks 84, the parts being held together by bolts 85. The filler block 84, at the left or inside rails is provided with a recess 86 for accommodating the flange 87 of the car wheels. The filler block 84 between the outside rails is provided with a guiding portion 88 on which the flange 87 of the outside wheel is adapted to ride as the car rounds the curves in the turn-out section $m'$. It will be clear that when the flanges 87 of the outside wheels ride on the guiding portion 88, the effective diameter of the outside wheels is increased. This increases the peripheral speed of the outside wheels and automatically causes the car to follow the curvature of the turn-out section $m'$. In the modification shown in Figs. 19 and 20, the inside wheels of the car are each provided with an inner flange or tread rim 89 which is adapted to ride on the top 90 of the guide rail 91. The inner rim 89 being of smaller diameter than the outer tread rim 92 of the car wheel, it follows that when the inner tread rim 89 rides over the guide flange 90, the effective diameter of the inner wheels is decreased—or reversely put, the effective diameter of the outer wheels is increased, thereby causing the car to round the curve automatically, as above explained. The guide rail 91' could be made as shown in Fig. 20 where it is provided with a supporting flange 90' in lieu of the filler block 84. The automatic guiding means has not been shown in Fig. 8, so as not to obscure the figure with additional lines. It will, of course, be obvious that so far as the basic idea of my invention is concerned, no guiding means is necessary in connection with the turn-out section. However, in the preferred embodiment of my invention such guiding means is employed. It will be clear that the guiding means illustrated in Figs. 17 to 20 is applicable to track curves generally.

The movable inclined track M will usually be fastened to the steam shovel by cable or otherwise so that it will move forwardly with the steam shovel whenever the latter has cut or dug to its limit. Or, the movable track can be hauled ahead by cable from the hoisting engine after the shovel has been moved up, if the hoisting engine is mounted on the steam shovel. In almost all cases the movable track could be fastened to the steam shovel, but should the steam shovel not have sufficient power to move with the inclined track attached to it, a power cable from the hoisting engine would have to be used. This would not cause any delay, as the inclined track could be hauled up while the jack arms of the steam shovel were being adjusted. Should it become necessary to move the shovel back, the two sections of the inclined track M can be disconnected by removing the two rails 93 and 94, together with the transverse beams 19 and 22. The tapered ends of the rails $m$ and M' are removed or thrown back, according to whether the point of connection 13 is a removable pin or hinge, and the two sections of the inclined track can then be hauled back by a locomotive.

From the above detailed description of the embodiment of my invention illustrated in the accompanying drawings, the many and great advantages of my invention as compared with the methods heretofore practiced, will be apparent. Among those advantages I may mention the following: The system of my invention eliminates the use of a locomotive which has heretofore been necessary in the "spotting" of cars, the work of this locomotive being done by the hoisting engine which can be operated at less cost than the locomotive. The cost of track work is greatly reduced because not nearly so much track has to be laid and shifted as in the old methods of operation. The excessive cost of grading loading tracks with teams under the old method of operation, is eliminated, all of the grading in the use of my invention being much more economically done with the steam shovel. The necessity of "spotting" cars on a steep grade where the engine can hold only two or three cars at a time, is eliminated. My invention makes it possible to make cuts with the steam shovel where it is impracticable to construct a loading track ahead of the excavating work done by the steam shovel—such as excavating beneath railroad crossings, beneath streets and highways, making approach cuts to tunnels, etc. The use of the hopper obviates any interruption in the work of the steam shovel between shifts of cars, whereby the daily capacity of the steam shovel is increased. Whereas, under the old method of operation, the number of cars that could be handled in a train is the number of cars which the locomotive can handle on a steep grade loading track, in the use of my invention the number of cars that can be handled in a train is the number of cars that the locomotive can handle on an easy main-line grade. The hauling track may be laid permanently to constitute the main-line track, since the steam shovel can make the desired cut in a single trip.

Having thus described my invention what I claim as new and desire to secure by Letters Patent of the United States is:

1. In an excavating apparatus for making a deep cut, the combination of an excavator track, an excavating machine supported thereon, a loading track parallel with and in the same plane as the excavator track, a movable support designed to travel on said loading track and having an inclined track for receiving and discharging the dump cars and a downwardly inclined turn-out section connecting with said inclined track for the purpose set forth.

2. In an excavating apparatus for making a deep cut, a main track, an excavating machine supported thereon, a loading track parallel with and in the same plane as said main track, a movable track mechanism comprising a main series of trucks mounted upon the loading track and a second series of trucks mounted upon the main track and an inclined track supported on said trucks for the purpose set forth.

3. In a system of the class described, the combination of a shovel track, a suitable excavating machine supported thereon, a loading track beside the shovel track on the same level, a series of cars movably supported on the shovel track at the rear of the excavating machine, a second series of cars movably supported on the loading track and extending to a point near the front end of the excavating machine, inclined rails supported on said two series of cars, and gradually rising from the shovel and loading tracks to a suitable height beside the excavating machine for receiving the dump cars to be loaded, said inclined rails comprising a main section which lies directly over the loading track and a turn-out section which extends from the shovel track over to the main section, and cable connections for hauling empty cars up said turn-out section into loading position on the main section.

4. In a system of the class described, the combination with a suitable excavating machine, of movable track mechanism on which the dump cars are shifted for loading, said movable track mechanism including a series of cars for supporting inclined rails provided with an automatically adjustable extension which is adapted to be engaged by the car in loading position.

5. In a system of the class described, the combination of a shovel track, a suitable excavating machine supported thereon, a loading track partly paralleling said shovel track on the same level therewith, movable rails for receiving from the shovel track the dump cars to be loaded, the said rails inclining toward the shovel track and comprising a main section supported directly over the loading track and a turn out section supported by both tracks, and the said rails comprising detachable sections for the purpose specified.

6. Movable track mechanism adapted to be associated with a steam shovel or other excavating machine, comprising a main series of cars arranged to run over a loading track and a second series of cars arranged to run over a shovel track laid on a level with the loading track, inclined rails supported on said cars for receiving dump cars to be loaded, said rails consisting of a main section supported by the main series of cars and a turn-out section supported jointly by cars of both series, and automatically adjustable extension rails at the high end of said main section.

7. The combination with an excavating machine, a track therefor, and a loading track, of a movable track mechanism comprising a main series of cars arranged to run over the loading track and a second series of cars arranged to run over the shovel track laid on a level with the loading track, inclined rails supported by said cars for receiving from the shovel track dump cars to be loaded, said rails consisting of a main section supported by the main series of cars and a turn-out section supported jointly by cars of both series, a frame-work carried by said main series of cars and means mounted on said frame-work for controlling the operation of the dump cars.

8. Movable track mechanism adapted to be associated with a steam shovel or other excavating machine, comprising a main series of cars arranged to run over a loading track and a second series of cars arranged to run over a shovel track laid on a level with the loading track, inclined rails supported on said cars for receiving the dump cars to be loaded, said rails consisting of a main section supported by the main series of cars and a turn-out section supported jointly by cars of both series, a frame-work carried by said main series of cars, a hoisting engine mounted on said frame-work for controlling the dump cars, a second frame-work carried by said main series of cars, a hopper mounted on said frame-work so as to extend over the car to be loaded, and connections whereby the hoisting engine controls the door of the hopper.

9. In a system of the class described, the combination of a suitable excavating machine, a frame-work beside said excavating machine terminating short of the end thereof, a distributing hopper mounted on said frame-work for receiving the excavated material from said machine, a car adapted to be moved under said hopper, said hopper extending over the car in loading position to discharge the material into the car at places which could not otherwise be loaded.

10. In a system of the class described, the combination of a suitable excavating machine, a frame-work beside said excavating machine terminating short of the end thereoof, a distributing hopper mounted on said frame-work for receiving the excavated material from said machine, and an inclined track running under said hopper to receive the cars to be loaded, said hopper extending back over the car in loading position to discharge the material into the car at places which could not otherwise be loaded.

11. In a system of the class described, the combination of a suitable excavating machine, an inclined track extending parallel with and associated with said excavating machine for receiving the cars to be loaded, a hoisting engine for hauling the cars up the inclined track into loading position from which position they can run down by gravity, a hopper extending over the rear end of the car in loading position, and connections for controlling the door of the hopper from said hoisting engine.

12. In a system of the class described, the combination of an excavating machine, a frame-work beside said excavating machine, a hopper mounted in said frame-work for receiving the excavated material from said machine, an inclined track running under said hopper to receive the cars to be loaded, said hopper extending over the car in loading position to discharge the material into the car behind the point at which the excavating machine could deposit it and a hoisting engine for hauling the cars into loading position and from which position they may descend by gravity.

13. In a system of the class described, the combination of a suitable excavating machine, a frame-work beside said excavating machine, a hopper mounted on said frame-work for receiving the excavated material from said machine, an inclined track running under said hopper to receive the cars to be loaded and from which the cars may return by gravity, said hopper extending over the car in loading position to discharge the material into the car, means for hauling the cars into loading position and connections for controlling the door of the hopper from the hoisting engine.

14. A movable track mechanism adapted to be associated with a steam shovel or other excavating machine, comprising a plurality of cars, inclined tracks carried by said cars, a support carried by one of said cars and extending above the inclined track, a hopper carried by said support, a second support carried by one of the cars and extending above the inclined track, means carried by the last mentioned support for operating the dumping cars upon the inclined track and for opening the door of the hopper, substantially as and for the purpose specified.

In witness whereof I hereunto subscribe my name this 5th day of April, A. D. 1911.

ALEXANDER B. B. HARRIS.

Witnesses:
M. H. DOOLEY,
A. A. THOMAS.